United States Patent [19]
Proietti

[11] 3,768,195
[45] Oct. 30, 1973

[54] FISH LURE
[76] Inventor: Albert C. Proietti, 49 Copeland St., Quincy, Mass. 02169
[22] Filed: Apr. 27, 1971
[21] Appl. No.: 137,842

[52] U.S. Cl................................ 43/42.33, 43/43.16
[51] Int. Cl............................................... A01k 85/00
[58] Field of Search....................... 43/42.33, 42.32, 43/42.34, 42.24, 42.25, 42.28, 43.16

[56] References Cited
UNITED STATES PATENTS

| | | | |
|---|---|---|---|
| 2,501,723 | 3/1950 | Harvey | 43/42.33 X |
| 3,540,144 | 11/1970 | Gurka | 43/42.33 |
| 2,618,095 | 11/1952 | Igo | 43/42.24 |
| 2,152,948 | 4/1939 | Bocchino | 43/42.24 |
| 2,019,959 | 11/1935 | Frevert | 43/42.32 |
| 2,583,942 | 1/1952 | Harvey | 43/42.33 X |
| 2,708,325 | 5/1955 | Dillon | 43/42.28 |
| 2,799,963 | 7/1957 | Noer | 43/42.32 X |
| 3,023,536 | 3/1962 | Williams | 43/43.16 UX |

FOREIGN PATENTS OR APPLICATIONS

| | | | |
|---|---|---|---|
| 112,954 | 5/1968 | Norway | 43/42.24 |
| 117,888 | 10/1969 | Norway | 43/42.24 |

Primary Examiner—Louis G. Mancene
Assistant Examiner—James H. Czerwonky
Attorney—Harold E. Cole

[57] ABSTRACT

A fish lure has a sheet of faceted material extending around the shank of a fish hook, which, when light strikes a facet, it is reflected, thereby attracting fish. Extending around the faceted material is a transparent sleeve that protects the sheet. The hook shank is mounted on a swivel by means of a loop, and the sheet material extends through the loop to provide two lengths which extend from the loop along and outside the shank. Said sleeve may have portions that are colored to resemble small fish or otherwise attract them by different shades that are light and dark relative to each other.

2 Claims, 7 Drawing Figures

PATENTED OCT 30 1973  3,768,195

Inventor:
Albert C. Proietti,
by Harold E. Cole
Attorney

FISH LURE

The principal object of my invention is to provide a lure that attracts fish because of reflected beams of light, which facets are carried by an inexpensive sheet that can be attached to and conceal a fish hook shank by a simple operation and which sheet bears colors that vary said beams of light.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings, nor to the particular parts described in the specification; but am entitled to all such changes therefrom as fall within the scope of my claims.

As illustrated, my fish lure has a hook 10 including a shank 12 and a well-known swivel 14 at one end that has an inner loop 15. Said shank is preferably bent to give it additional action in the water.

Figure 6:
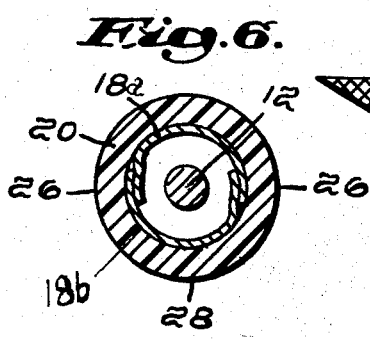
FIG. 6 is an enlarged, sectional view taken on the line 6—6 of FIG. 4.
Figure 7:
FIG. 7 is a fragmentary, top plan view of the faceted sheet ready for attachment to a fish hook shank.

Covering all or a major portion of the length of said shank 12 is a flexible sheet 18 of faceted material which, in use, is folded across a half-way point to provide two connected lengths 18a and 18b, of preferably the same length and as shown in said FIG. 6. This sheet may provide exterior facets for the full length of said shank. These lengths 18a and 18b are folded lengthwise laterally towards each other for their full length and may overlap at the edges as shown in said FIG. 6. Or their longitudinal edges may, when folded, be brought together and held there by a transparent, adhesive tape extending across said edges, not shown.

Figure 1:
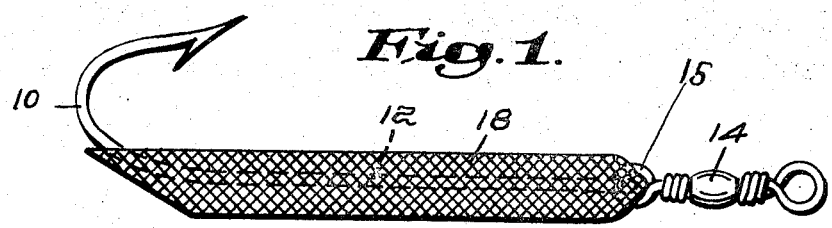
FIG. 1 is a side elevational view of a fish lure, the shank of which is covered by a faceted sheet.
Figure 2:
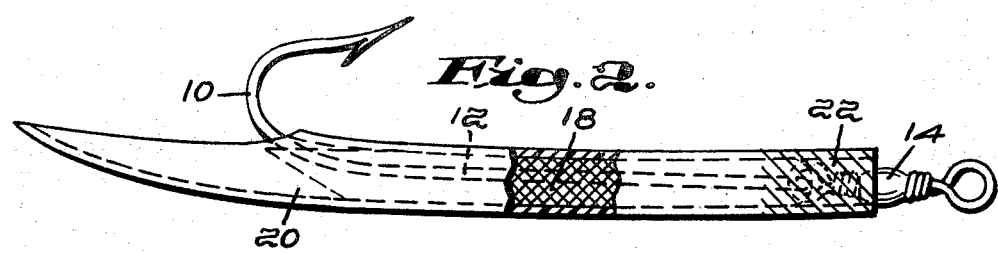
FIG. 2 is a side elevational view of a fish lure as shown in FIG. 1, but showing a transparent sleeve outside of said sheet, the latter being partly broken away to show a portion of said sheet.

This assembly of the sheet with the hook shank is accomplished by inserting one end of said sheet 18 into said swivel loop 15 and drawing it through until said lengths 18a and 18b are approximately equal whereupon they are folded laterally as above explained. Thus said sheet 18 serves to cover the hook shank, as shown in said FIG. 1.

Said sheet of faceted material is a polyester film (known as "Mylar" in the trade) that has been metallized, and is a highly reflective material. It has a silver-like appearance or otherwise has a light shade. Since the surface is faceted, the facets reflect light, thus making it noticeable to and attractive to fish.

Outside of said sheet 18 is a transparent sleeve or cover 20, which may be made of plastic such as vinyl tubing, and preferably is thicker than said sheet material 18. Said sleeve is open at both ends and extends beyond said sheet 18 at each end, and completely covers the latter, serving as an exterior protector therefor.

Figure 3:
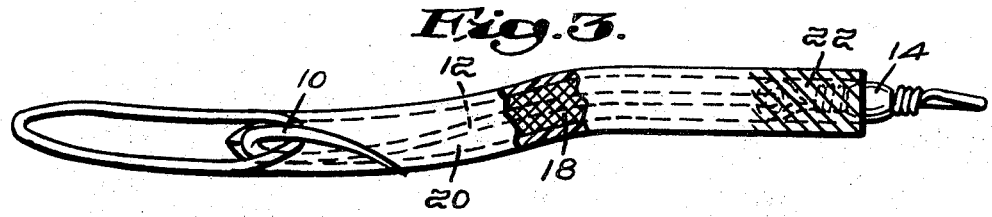
FIG. 3 is a top plan view of the fish lure shown in FIG. 2.

To make my lure more attractive, a relatively small portion 22 of said sleeve 20, at the swivel end, is preferably colored a relatively dark shade completely around said sleeve. I have indicated green 22, for instance, in the modification shown in said FIG. 3. The facets on said sheet 22 are visible through said colored sleeve 20, thus reflecting light differently than said adjoining lighter or silver-like shade. Also, under some circumstances the facets opposite this portion 22, may not reflect light, while the remainder of said sheet 18 may do so.

Figure 4:
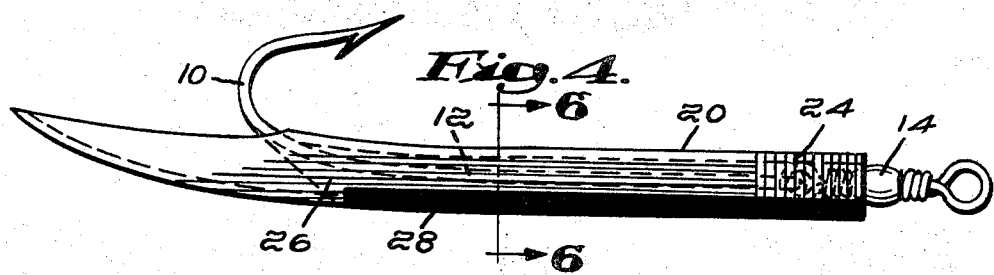
FIG. 4 is a side elevational view of a modified form of my lure.
Figure 5:
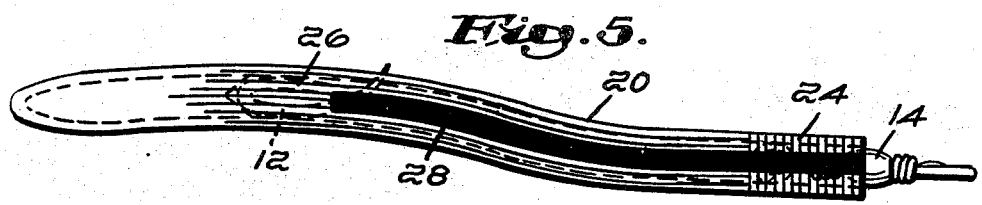
FIG. 5 is a bottom plan view of the lure showing in FIG. 4.

A further modified form of my invention is shown in said FIGS. 4 and 5, in which a short portion 24 (lengthwise) of said sleeve similar to said portion 22, is colored red completely around said sleeve, as indicated on the drawing. Extending from said portion 24, lengthwise of said lure surface, are two elongate portions 26. They are differently colored, such as blue, as indicated, there being two lengths spaced laterally apart, extending the remaining length of said sleeve 20.

Between said colored portions 26 (shown as blue) and at least of the same length, is an elongate portion 28 that is preferably a darker color than said portion 26, such as black, as shown. This portion 28 may extend also over said portion 24, as shown, providing a very dark stripe the full length of said shank. However, said portions 26, as well as said portion 28 may extend the full length of said sleeve by omitting said colored portion 24, and be effective as an attractive lure.

The remainder of said sheet 18 presents an elongate, silver-like surface, or some other light shate through an uncolored portion of said sleeve 20. Thus it appears similar to the belly of one or more types of fish. It extends unbroken laterally between said blue portions 26.

Thus said lure, as shown in said FIG. 4 and 5, provides a variety of coloring and an uncolored, silver-like portion, or a relatively light shade, with all the facets showing through said transparent sleeve 20. Thus my lure has somewhat the appearance of a small fish of the type that has a variety of colors along with a light colored belly.

What I claim is:

1. A lure comprising a hook having a shank, a sheet of material connected to said lure next to and extending around said shank, a sleeve mounted on said lure and extending around and covering said sheet, said lure including a swivel having a loop attached to said shank, said sheet extending through said swivel loop thereby providing two lengths extending from said loop along and outside of said shank.

2. A lure as in claim 1, said sheet material being metallized and faceted, said sleeve being transparent, all of said sheet that is visible through said sleeve being faceted, said sleeve extending forward of and beyond said hook and shank at one end of said lure and being open thereat.

* * * * *